US012626452B2

(12) United States Patent
Shayne et al.

(10) Patent No.: US 12,626,452 B2
(45) Date of Patent: May 12, 2026

(54) VIRTUAL REALITY ASSISTED CAMERA PLACEMENT

(71) Applicant: ObjectVideo Labs, LLC, Tysons, VA (US)

(72) Inventors: Ethan Shayne, Clifton Park, NY (US); Donald Gerard Madden, Columbia, MD (US)

(73) Assignee: ObjectVideo Labs, LLC, Tysons, VA (US)

( * ) Notice: Subject to any disclaimer, the term of this patent is extended or adjusted under 35 U.S.C. 154(b) by 325 days.

(21) Appl. No.: 18/205,351

(22) Filed: Jun. 2, 2023

(65) Prior Publication Data

US 2023/0394741 A1      Dec. 7, 2023

Related U.S. Application Data

(60) Provisional application No. 63/348,761, filed on Jun. 3, 2022.

(51) Int. Cl.
| | |
|---|---|
| *G06T 15/20* | (2011.01) |
| *G06T 7/00* | (2017.01) |
| (Continued) | |

(52) U.S. Cl.
CPC ............ *G06T 15/20* (2013.01); *G06T 7/0002* (2013.01); *G06T 13/40* (2013.01); *G06T 17/00* (2013.01);
(Continued)

(58) Field of Classification Search
None
See application file for complete search history.

(56) References Cited

U.S. PATENT DOCUMENTS

| | | | |
|---|---|---|---|
| 7,603,633 | B2 | 10/2009 | Zhao et al. |
| 9,672,707 | B2 | 6/2017 | Kerzner |
| | | (Continued) | |

FOREIGN PATENT DOCUMENTS

| | | |
|---|---|---|
| WO | WO2011041791 | 4/2011 |
| WO | WO2012153805 | 11/2012 |

OTHER PUBLICATIONS

Albahri; "Simulation-based optimization or the placement of surveillance cameras in buildings using BIM;" Jan. 2017; PhD thesis, Concordia University; pp. 1-180 (Year: 2017).*

(Continued)

*Primary Examiner* — Peter Hoang
(74) *Attorney, Agent, or Firm* — Fish & Richardson P.C.

(57) ABSTRACT

Methods, systems, and apparatus, including computer programs encoded on computer-storage media, for generating a placement of a camera. In some implementations, maintaining monitoring information of a property; generating a virtual model of a property; determining an initial placement location for a virtual camera in the virtual model; obtaining image data generated in the virtual model from the virtual camera placed at the initial placement location; analyzing the image data; determining, using the analysis of the image data, whether to identify an updated placement location; and providing the placement location for a physical camera at the property to a device using a result of the determination whether to identify the updated placement location.

20 Claims, 5 Drawing Sheets

(51) Int. Cl.
    *G06T 13/40*        (2011.01)
    *G06T 17/00*        (2006.01)
(52) U.S. Cl.
    CPC .............. *G06T 2207/30168* (2013.01); *G06T 2207/30196* (2013.01); *G06T 2207/30232* (2013.01); *G06T 2207/30244* (2013.01)

(56)                References Cited

U.S. PATENT DOCUMENTS

| | | |
|---|---|---|
| 9,811,990 B2 | 11/2017 | Kerzner |
| 10,049,544 B2 | 8/2018 | Kerzner |
| 10,504,348 B2 | 12/2019 | Kerzner |
| 10,600,297 B2 | 3/2020 | Kerzner |
| 10,950,103 B2 | 3/2021 | Kerzner |
| 11,257,336 B2 | 2/2022 | Kerzner |
| 2005/0222820 A1 | 10/2005 | Chung |
| 2007/0247976 A1 | 10/2007 | Capozzi et al. |
| 2008/0246734 A1 | 10/2008 | Tsui et al. |
| 2008/0291279 A1 | 11/2008 | Samarasekera et al. |
| 2009/0249227 A1 | 10/2009 | Clark et al. |
| 2010/0033783 A1 | 2/2010 | Klug et al. |
| 2010/0245585 A1 | 9/2010 | Fisher et al. |
| 2013/0063550 A1 | 3/2013 | Ritchey et al. |
| 2013/0343196 A1 | 12/2013 | Swedo |
| 2014/0375552 A1 | 12/2014 | Kasuga |
| 2014/0375800 A1 | 12/2014 | Lim et al. |
| 2015/0026647 A1 | 1/2015 | Park et al. |
| 2015/0046828 A1 | 2/2015 | Desai et al. |
| 2015/0177841 A1 | 6/2015 | VanBlon et al. |
| 2016/0224126 A1 | 8/2016 | Andersson et al. |
| 2016/0267759 A1 | 9/2016 | Kerzner |
| 2017/0039829 A1 | 2/2017 | Kerzner |
| 2017/0263091 A1 | 9/2017 | Kerzner |
| 2018/0018862 A1 | 1/2018 | Kerzner |
| 2018/0350217 A1 | 12/2018 | Kerzner |
| 2020/0286347 A1 | 9/2020 | Kerzner |
| 2021/0073449 A1* | 3/2021 | Segev ..................... G06F 30/27 |
| 2021/0174654 A1 | 6/2021 | Kerzner |
| 2022/0148398 A1 | 5/2022 | Kerzner |

OTHER PUBLICATIONS

Aissaoui et al.; "Designing a camera placement assistance system for human motion capture based on a guided genetic algorithm;" 2018; Virtual Reality 22, pp. 13-23. https://doi.org/10.1007/s10055-017-0310-7 (Year: 2018).*

Bodor et al.; "Optimal Camera Placement for Automated Surveillance Tasks;" 2007; Intell Robot Syst 50, pp. 257-295 https://doi.org/10.1007/s10846-007-9164-7 (Year: 2007).*

"Controls and Basic Movement—The Legend of Zelda: Twilight Princess," Supercheats.com, retrieved on Jan. 12, 2016. Retrieved from the Internet: URL<http://www.supercheats.com/guides/the-legend-of-zelda-twilight-princess/Controls-and-basic-...1>, 10 pages.

"Uses of the Emotic Epoc wireless EEG neuroheadset," 3 pages.

Aoki et al., "Gesture Identification Based on Zone Entry and Axis Crossing," Human-Computer Interaction. Interaction Techniques and Environments Lecture Notes in Computer Science vol. 6762, 2011, 194-203, Abstract only, 5 pages.

Assistive Technology Center' [online]. "Head Controlled Mice," Feb. 7, 2014 [retrieved on Feb. 7, 2014]. Retrieved from the internet: URL <http://www.assistiveteclmologycenter.org/tlc/ca/head.php>, 2 pages.

Boost Technology' [online]. "Boost Tracer Product Description," [retrieved on Feb. 7, 2014]. Retrieved from the internet: URL<http://www.boosttechnologv.com/tracer_description.html>, 1 page.

Boost Technology' [online]. "Headpointer Comparison," [retrieved on Feb. 7, 2014]. Retrieved from the internet: URL<http://www.boosttechnology.com/cornpare.html>, 2 pages.

Brockmann et al., "Remote Vision-Based Multi-type Gesture Interaction," Gesture-Based Communication in Human-Computer Interaction Lecture Notes in Computer Science vol. 2915, 2004, 198-209. (Abstract and p. 199 only).

Castellano et al., "Analysis of Emotional Gestures for the Generation of Expressive Copying Behaviour in an Embodied Agent," Gesture-Based Human-Computer Interaction and Simulation Lecture Notes in Computer Science vol. 5085, 2009, 193-198. (Abstract and p. 196 only).

Eom et al., "Gyro-Mouse for the Disabled: 'Click' and 'Position' Control of the Mouse Cursor," International Journal of Control, Automation, and Systems, 5(2):147-154, Apr. 2007.

InterSense' [online]. "Clinical Visual Acuity & Gaze Stabilization," 2014 [retrieved on Feb. 7, 2014]. Retrieved from the internet: URL<http://www.intersense.com_pages/149/136/>, 2 pages.

InterSense' [online]. "Head Mounted Displays (HMD)," 2014 [retrieved on Feb. 7, 2014]. Retrieved from the internet: URL<http://www.intersense.com/pages/11/71/>, 2 pages.

Kinect Hacks' [online]. "FAAST on you PC," 2013 [ retrieved on Feb. 14, 2014]. Retrieved from the internet: URL <http:i/www.kinecthacks.com/guides/install-faast-on-vour-pci>, 9 pages.

Microsoft' [online]. "Face Tracking," 2014 [retrieved on Feb. 14, 2014]. Retrieved from the internet: URL<http://msdn.microsoft.com/en-us/library/jj 130970.asnx>, 18 pages.

Microsoft' [online]. "KinectInteraction Concepts," 2014 [retrieved on Feb. 14, 2014]. Retrieved from the internet: URL<http://msdn.microsoft.com/en-us/library/dn188673.asgx>, 3 pages.

Microsoft' [online]. "KinectInteraction Control," 2014 [retrieved on Feb. 14, 2014]. Retrieved from the internet: URL<http://msdn.microsoft.corn/en-us/library/dn188674.asgx>, 2 pages.

Microsoft' [online]. "Skeletal Tracking," 2014 [retrieved on Feb. 14, 2014]. Retrieved from the internet: URL<http://msdn.microsoft.com/en--us/library/hb973074.asgx>, 4 pages.

Natural Point' [online]. "What is SmartNav?" Aug. 16, 2012 [retrieved on Feb. 7, 2014]. Retrieved from the internet: URL<http://www.naturalpoint.corn/smartnav/>, 2 pages.

Neurotechnology., "NPointer 2.0," Product documentation, 2012-2013, 5 pages.

OoCities' [online]. "Cheap Head tracking for Gamers," Oct. 2009 [retrieved on Feb. 7, 2014]. Retrieved from the internet: URL<http://www.oocities.org/mellott124/gamersHeadtracking.htm>, 1 page.

Rosas-Cholula et al., "Gyroscope-Driven Mouse Pointer with an Emotiv® EEG Headset and Data Analysis Based on Empirical Mode Decomposition," Sensors 2013, 13, 10561-10583.

Vatavu et al., "Multi-Level Representation of Gesture as Command for Human Computer Interaction," Computing and Informatics, vol. 27, 2008, 837-851.

Virtual Reality' [online]. "3DOF Tracker," Mar. 3, 2008 [retrieved on Feb. 7, 2014]. Retrieved from the internet: URL< http//www.virtualreality.net.au/3DOF_Tracker>, 10 pages.

Virtual Reality' [online]. "6DOF Tracker," Apr. 28, 2008 [retrieved on Feb. 7, 2014]. Retrieved from the internet: URL<http://www.virtualreality.net.au/6DOF_Tracker>, 4 pages.

Wikipedia' [online]. "Emotiv Systems," Jan. 15, 2014 [retrieved on Feb. 7, 201]. Retrieved from the internet: URL<http://en.wikinedia.org/wiki/Emotiv_Systems>, 5 pages.

Wikipedia' [online]. "Facial Action Coding System," Jan. 23, 2014 [retrieved on Feb. 14, 2014]. Retrieved from the internet: URL<http://en.wikipedia.org/wiki/Facial_Action_Coding_System>, 10 pages.

* cited by examiner

400

```
┌─────────────────────────────────────────────────┐
│  OBTAIN MONITORING INFORMATION OF THE PROPERTY   │
│                                            402    │
└─────────────────────────────────────────────────┘
                        │
                        ▼
┌─────────────────────────────────────────────────┐
│     GENERATE A VIRTUAL MODEL OF A PROPERTY        │
│                                            404    │
└─────────────────────────────────────────────────┘
                        │
                        ▼
┌─────────────────────────────────────────────────┐
│  DETERMINE AN INITIAL PLACEMENT LOCATION FOR A    │
│    CAMERA IN THE VIRTUAL MODEL            406     │
└─────────────────────────────────────────────────┘
                        │
                        ▼
┌─────────────────────────────────────────────────┐
│  OBTAIN IMAGE DATA GENERATED IN THE VIRTUAL       │
│  MODEL FROM THE CAMERA PLACED AT THE INITIAL      │
│         PLACEMENT LOCATION                 408    │
└─────────────────────────────────────────────────┘
                        │
                        ▼
┌─────────────────────────────────────────────────┐
│            ANALYZE THE IMAGE DATA                 │
│                                            410    │
└─────────────────────────────────────────────────┘
                        │
                        ▼
┌─────────────────────────────────────────────────┐
│  DETERMINE WHETHER TO IDENTIFY AN UPDATED         │
│  PLACEMENT LOCATION USING THE ANALYSIS OF THE     │
│         IMAGE DATA                         412    │
└─────────────────────────────────────────────────┘
                        │
                        ▼
┌─────────────────────────────────────────────────┐
│  PROVIDE THE PLACEMENT LOCATION TO A DEVICE OF    │
│              A USER                        414    │
└─────────────────────────────────────────────────┘
```

FIG. 4

VIRTUAL REALITY ASSISTED CAMERA PLACEMENT

CROSS-REFERENCE TO RELATED APPLICATION

This application claims the benefit of U.S. Provisional Application No. 63/348,761, filed Jun. 3, 2022, the contents of which are incorporated by reference herein.

BACKGROUND

A monitoring system for a property can include various components including sensors, e.g., cameras, and other devices. For example, the monitoring system may use the camera to capture images of people or objects of the property.

SUMMARY

This specification describes techniques, methods, systems, and other mechanisms for modeling and determining security camera placements within an environment. For example, a computer can generate a three dimensional virtual model of a physical property and place virtual cameras at one or more locations within the virtual model. The computer can simulate actions, such as human movement, within the virtual simulation of the property, and analyze virtual image data from the virtual cameras to determine whether the placement satisfies a condition and whether to update the location based on analysis of the virtual image data. A system can use a final placement within the virtual model to determine camera placement at the physical property itself. For instance, the system can provide information about the actual placement to a device, for presentation on a user interface, and used to install a camera in the real world property corresponding to the location of the final placement location. In some examples, the system can provide instructions to a physical device, such as a robot, to cause the physical device to install a camera in the real world property corresponding to the location of the final placement location in the virtual model.

In general, one innovative aspect of the subject matter described in this specification can be embodied in methods that include the actions of maintaining monitoring information of a property; generating a virtual model of a property; determining an initial placement location for a virtual camera in the virtual model; obtaining image data generated in the virtual model from the virtual camera placed at the initial placement location; analyzing the image data; determining, using the analysis of the image data, whether to identify an updated placement location; and providing the placement location for a physical camera at the property to a device using a result of the determination whether to identify the updated placement location.

Other implementations of this aspect include corresponding computer systems, apparatus, computer program products, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other implementations can each optionally include one or more of the following features, alone or in combination.

In some implementations, obtaining the monitoring information of the property can include obtaining information of at least one mounting location. Determining the initial placement location for the virtual camera in the virtual model can include determining, using the information of the at least one mounting location, the initial placement location for the virtual camera in the virtual model. The information of the at least one mounting location can include information of a stud, an electricity source, an angle of a surface, a mounting point on a surface, a presence of a vent, or a presence of a sprinkler at the property. The surface can be a wall, or a ceiling. The mounting point can be on a recessed or dropped ceiling. The information of a presence of a component can indicate the lack of the component in a region of the property.

In some implementations, the method can include determining a distance between a location indicated by the information of the at least one mounting location and a candidate location satisfies a distance threshold; and in response to determining the distance between the location indicated by the information of the at least one mounting location and the candidate location satisfies the distance threshold, determining the initial placement location for the virtual camera in the virtual model. The method can include, in response to obtaining the monitoring information of the property, adjusting the distance threshold. The monitoring information of the property can include an indication of a power source for the virtual camera. The power source can be a power over Ethernet source, e.g., that provides both power and a network connection.

In some implementations, generating the virtual model of the property can include generating, using the monitoring information of the property, the virtual model of the property.

In some implementations, obtaining the monitoring information can include at least one of: obtaining data of a previously generated model of an environment; or obtaining real world security data from one or more properties.

In some implementations, obtaining the monitoring information of the property can include obtaining an identifier of a previously generated model. Generating the virtual model of the property can include (i) parsing the monitoring information of the property to obtain the identifier and (ii) obtaining the previously generated model from a database using the identifier in a query to the database.

In some implementations, obtaining the image data generated in the virtual model from the virtual camera placed at the initial placement location can include obtaining one or more images each of which depict a computer generated avatar moving in the virtual model of the property from a perspective of the virtual camera at the initial placement location. Analyzing the image data can include analyzing the images that depict at least a portion of an avatar.

In some implementations, the method can include generating, using the analysis of the images that depict at least the portion of the avatar, a rule for a monitoring system; and providing, to the monitoring system, data for the rule to cause the monitoring system to apply the rule to one or more images captured by the virtual camera.

In some implementations, analyzing the image data can include determining whether the images of the computer generated avatar moving in the virtual model of the property represent a full view of the computer generated avatar. Determining, using the analysis of the image data, whether to identify the updated placement location can include: in response to determining that the images of the computer generated avatar moving in the virtual model of the property do not represent a full view of the computer generated avatar, generating a coverage score representing an amount of the computer generated avatar; comparing the coverage score to a coverage threshold; and determining, using the comparison, whether to identify the updated placement location.

In some implementations, the computer generated avatar can be a human avatar, e.g., that is computer generated.

In some implementations, analyzing the image data can include determining an elapsed time between an action generated in the virtual model and a detection of the action represented in the image data. Determining whether to identify the updated placement location can use the elapsed time.

In some implementations, determining, using the analysis of the image data, whether to identify the updated placement location can include: comparing the elapsed time to an elapse time threshold; and determining, using the comparison, whether to identify the updated placement location.

The subject matter described in this specification can be implemented in various implementations and may result in one or more of the following advantages. In some implementations, the systems and methods described in this specification can improve system accuracy, reduce false positives, reduce false negatives, or a combination of these. For instance, by analyzing the image data and determining, using the analysis of the image data, whether to identify an updated placement location, the systems and methods can increase an accuracy of cameras capturing images for a property, e.g., the corresponding physical property. By placing a camera at an optimized position determined using the above mentioned features, the systems and methods can reduce false positives, false negatives, or both.

In some implementations, the systems and methods described in this specification can reduce computational resource usage by inferring rule parameters for multiple cameras given a few input examples, e.g., for a single camera, in the virtual environment. The rules can be used by physical cameras to detect objects of interest. The systems and methods can use results of analysis of the rules and data from the virtual environment to more accurately determine camera locations for the physical environment. The systems and methods described in this specification can reduce computational resource usage by virtually determining an optimal camera placement, using a virtual reality environment, e.g., compared to a system that changes the position manually. For instance, when a system changes the position manually, the system might require complete tests for each physical placement in contrast to a virtual system that might need to run only a subset of tests. In some examples, virtually experimenting to determine optimal camera placement may be faster, easier and safer than trying to do so physically. In some implementations, the use of a virtual environment with virtual experiments can enable testing of scenarios that would be difficult to test otherwise, e.g., the visualization of unlikely or rare scenarios that would be difficult, costly, or damaging to stage in real life. For instance, testing in a virtual environment can enable determining a result of "would a camera placed here be able to clearly see the license plate of a car if it crashed through the fence?"

The details of one or more embodiments of the invention are set forth in the accompanying drawings and the description below. Other features and advantages of the invention will become apparent from the description and the drawings.

BRIEF DESCRIPTION OF THE DRAWINGS

FIG. 4 is a flow diagram illustrating an example of a process 400 for generating a placement of a camera.

Like reference numbers and designations in the various drawings indicate like elements.

DETAILED DESCRIPTION

Camera placement is critical for a video security system. If a camera can't capture images of the areas to be secured, it can't detect problematic activity in those areas. And in most cases, once a camera has been mounted, it can't easily be moved. One way of addressing this is for a person to hold the camera in a proposed position and then check a video feed of the held camera, e.g., from another device, phone, tablet or laptop. However, this can be difficult (and even dangerous) for a sole installer and is also likely to provide only an approximate final field of view (FOV). And even if the intended FOV can be verified, it can be difficult to determine whether that FOV is going to actually include all relevant action, including traffic to and from a property or within a property. Using a virtual model of a property, both a camera's FOV as well as possible scenarios at the property can be simulated to ensure proper placement of the camera before the camera is permanently mounted and to aid in the mounting process.

Figure 1:
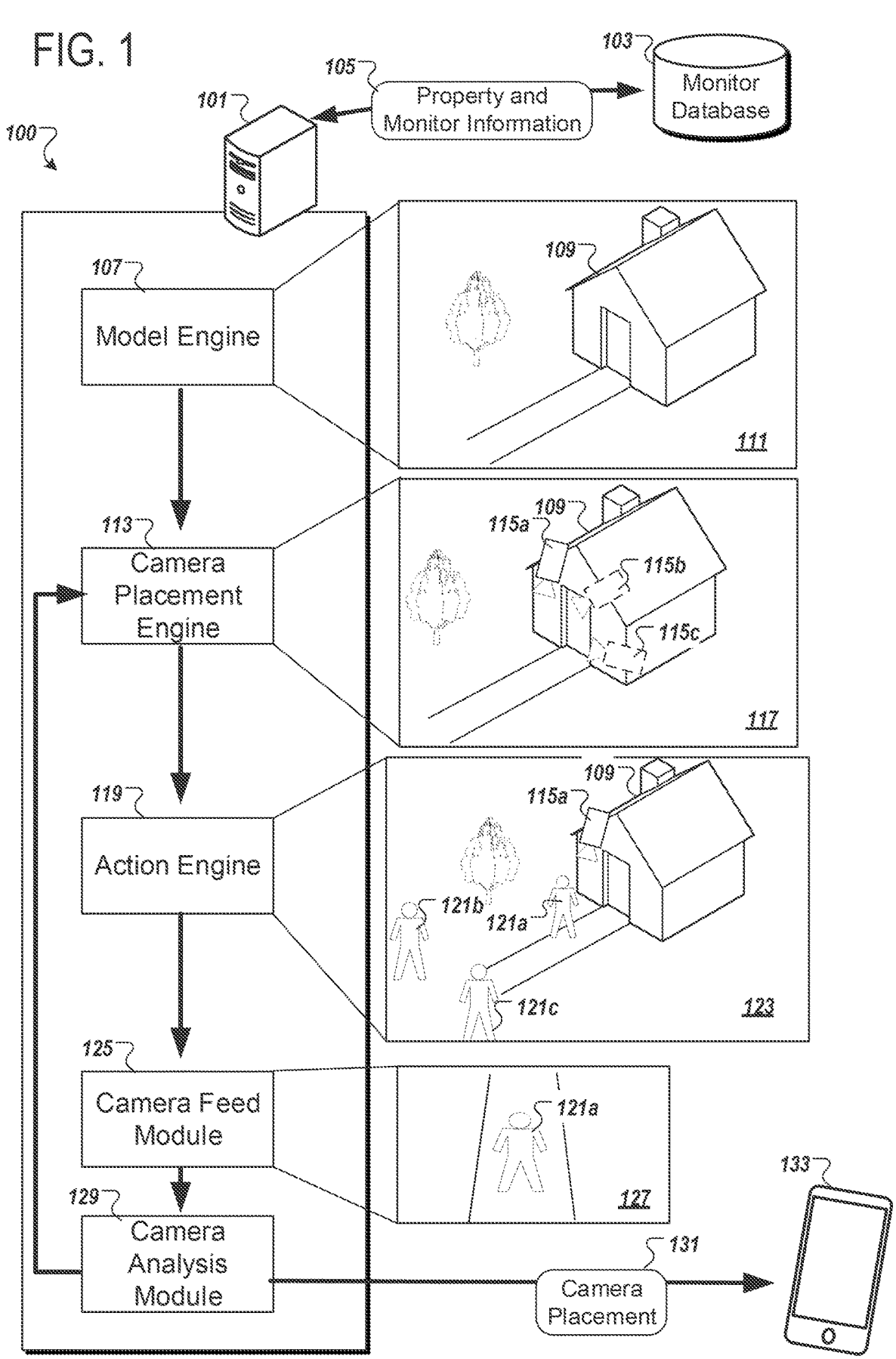
FIG. 1 is a diagram showing an example of a system for generating a placement of a camera.

FIG. 1 is a diagram showing an example of a system 100 for generating a placement of a camera. The system 100 includes a control unit 101, a monitor database 103, and a user device 133. The control unit 101 includes a model engine 107 configured to generate or access a virtual model of a property, a camera placement engine 113 configured to place one or more cameras within the virtual model, an action engine 119 configured to determine and initiate simulated actions within the virtual model, a camera feed module 125 configured to generate a camera feed from a camera placed within the virtual model, and a camera analysis module 129 configured to determine if the camera placement satisfies one or more thresholds for providing details of the placement to the user device 133.

The control unit 101 performs one or more computer processes using one or more hardware computer circuits to perform actions of the model engine 107, the camera placement engine 113, the action engine 119, the camera feed module 125, and the camera analysis module 129. The control unit 101 can include one or more data processing apparatuses, can be implemented in code, or a combination of both. The control unit 101 accesses property and monitor information 105 from the monitor database 103. The property and monitor information 105 includes details of a property.

In some implementations, the information 105 includes a generated virtual model of a property. For example, the control unit 101, or another system, can generate a model and store the model on the monitor database 103 for later retrieval. The model can be of an interior area, exterior area (e.g., an outdoor area), or a combination of both. For instance, the model can include information about the interior of a building and the exterior of the building, e.g., the lawn outside the building.

In some implementations, the information 105 includes one or more parameters for generating a model. For example, the parameters can include information about one or more items at a property. The information can include a unique identifier indicating a particular virtual model stored at the control unit 101 or in a storage device communicably connected to the control unit 101. The virtual model can be a three-dimensional representation of a real world environment.

The model engine 107 accesses a virtual model of a property. A view 111 from within the virtual model is shown in FIG. 1. In some implementations, the model engine 107 generates the virtual model. In some implementations, the model engine 107 obtains the model from the information 105. The virtual model can include virtual representations of real world objects present at a property. For example, the model can include a virtual representation of a house 109 of a property. The house 109 can be a three dimensional virtual representation.

In some implementations, the model includes details of the house 109. For example, the model can include locations of outlets, internal wiring, windows, doors, available camera mounts, among other features. In some implementations, the model includes details of elements surrounding the house 109. For example, the model can include a yard, sidewalk, streets, plants, other buildings, among others. In some implementations, the model includes environmental features. For example, the model can include different weather, including precipitation, trees and other plants, animals, among others. In some implementations, precipitation obscures a camera view. For example, falling snow can accumulate in the model enough to block the view of a camera based on the features around the given camera. Weather events, such as snow, can be performed by the action engine 119 to determine if a camera position satisfies one or more thresholds for placement.

The control unit 101 can simulate a snowstorm, including snow piling up at various points around a camera taking into account existing overhangs, rooflines, plants, or a combination of these. The camera analysis module 129 can then determine how the accumulation would impact the view from a virtual camera. For example, even if an outdoor camera is mounted under a porch roof, the control unit 101 may determine that snow is going to pile up on a nearby structure, e.g., a tree, and will block the camera view.

The camera placement engine 113 places a camera at camera position 115*a*. Other camera positions are shown as camera positions 115*b-c* in view 117 of the virtual model. In some implementations, camera positions are within a house or another type of building or on other locations not shown in FIG. 1. In some implementations, the camera placement engine 113 determines, based on features of the house 109, the camera position 115*a*. For example, the camera placement engine 113 can determine a stud location within the wall of the house 109 as a location for a mount and then determine, based on the location of the stud and mount, a camera position. Features of the house 109 can be provided by the model engine 107 or within the information 105. The camera placement engine 113 can determine an electric wire or outlet near the camera position 115*a*.

In some implementations, the camera placement engine 113 uses one or more placement thresholds to determine where to place a camera. For example, the camera placement engine 113 can determine a location of a feature, such as a stud, mounting location, electricity source, among others. The camera placement engine 113 can compare a candidate placement location with the location of the feature. If the distance between the two satisfies a distance threshold, the camera placement engine 113 can determine the candidate placement location as a camera position, such as camera position 115*a*.

In some implementations, the camera placement engine 113 can determine a specific type of camera based on a camera placement. For example, a type of camera that can run on battery or solar power may not require a location next to an electricity source such as an outlet or electric wire. This type of camera may have a different set of placement thresholds or none at all, e.g., other than any threshold related to image capture. In general, the camera placement engine 113 can determine a placement based on features of a camera and features of a property. The camera placement engine 113 can determine, from a number of candidate locations, one or more camera positions for subsequent camera analysis based on determined features of the camera, e.g., FOV, power needs, weight, mounting requirements, among others.

In some implementations, a user places a virtual camera in a given location using a control interface provided by the control unit 101. For example, the control unit 101 can generate an interface with one or more controls. A user can operate with a touch screen, mouse, or other interface controls with the generated interface. The generated interface can include options for adding cameras, changing environmental features, performing actions, such as human movement, fine tuning locations, among others.

After determining one or more camera placements, the action engine 119 generates one or more actions to be performed, e.g., simulated, within the virtual model. For example, the action engine 119 can generate human avatars 121*a-c* as shown in view 123. The action engine 119 can determine movement for the avatars 121*a-c* and generate movement of the avatars 121*a-c* within the model. For example, the action engine 119 can determine movement along a pathway leading to the house 109 or along a sidewalk in front of the house 109. In some implementations, the action engine 119 analyzes real world footage to determine actions to simulate within the virtual model. For example, the action engine 119 can access real world footage from the real world version of the house 109 and detect a person as well as the movement of the person within the footage. The action engine 119 can generate a computer generated version of a person and then generate movement to match the movement from the real world footage. In some implementations, the action engine 119 includes a generation process, including one or more randomization steps, to generate new movement that was not detected within real world footage.

After a camera is placed or the camera placement engine 113 places a camera, the camera feed module 125 of the control unit 101 simulates that virtual camera's viewpoint in the virtual world, generating a virtual video feed which can include actions generated by the action engine 119. The camera feed module 125 can access real world camera specifications. Real world camera specifications can affect the focus ability, zoom ability, FOV, resolution, among other features of the video. The camera feed module 125 can determine, based on the real world camera specifications for the camera at the camera position 115a, a camera feed for the camera (e.g., a camera feed with a FOV that matches a real world FOV for the camera type).

In some implementations, the camera feed module 125 cycles through camera types to determine an optimal type for a position. For example, the camera feed module 125 can access camera positions 115a-c from the camera placement engine 113. The camera feed module 125 can determine, based on the positions 115a-c, camera types suitable for the corresponding locations. For example, a camera positioned near a potential action area may more likely capture images depicting actions with a wide FOV. In contrast, a camera further away may more likely capture images depicting actions with a narrower FOV with more zoom capability. In general, the modules of the control unit 101, including the model engine 107, the camera placement engine 113, the action engine 119, the camera feed module 125, and the camera analysis module 129 can provide data to one another in one or more feedback loops to determine a most likely optimal position, a most likely optimal camera for the position, or both.

In some implementations, the camera feed module 125 generates a FOV, area covered, and a candidate angle. In some implementations, the camera feed module 125 generates a rendering of the actions of the action engine 119 from the perspective of a camera position, such as the camera position 115a. For example, as shown in item 127, the camera feed module 126 generates a virtual camera feed from the camera at position 115a. The camera feed includes a representation of the avatar 121a.

In some implementations, the camera feed module 125 generates camera feed in different modalities. For example, the camera feed module 125 can simulate thermal image data. The system 100 can include simulations of infrared (IR) illuminators. A user can provide control data to the control unit 101 through an interface. The data can be configured to cause the control unit 101 to simulate specific positions of IR illuminators. In some implementations, the control unit 101 determines a placement for one or more IR illuminators within the model. For example, the IR illuminators can be used to illuminate spots otherwise too dark for accurate detections. The control unit 101 can determine if a threshold light level for a given camera, or camera setting, is satisfied. Based on whether or not the threshold is satisfied, the control unit 101 can determine to place one or more IR illuminators or other types of illuminators, such as lights, to illuminate a simulated field of view of a simulated camera. A user can manually place them. The model can include a nighttime scenario, with decreased lighting, to simulate a real world nighttime environment. In some implementations, the camera analysis module 129 determines, based on multiple simulated modalities, an optimal modality. For example, in a dark area of a property, or for a camera designated for detections at night, the camera analysis module 129 can determine to use a camera with an infrared modality. The camera analysis module 129 can determine that detections based on data of a first modality (e.g., infrared) are more accurate than detections based on a data of a second modality (e.g., visual) for a given camera or position.

The camera analysis module 129 accesses one or more camera feeds from the camera feed module 125. The camera analysis module 129 determines, based on features of the camera feed, whether a given camera position satisfies one or more thresholds. In some implementations, the camera analysis module 129 determines whether the combination of a camera position and a given camera type satisfy one or more thresholds. For example, the camera analysis module 129 can determine one or more objects within the virtual feed from the camera feed module 125. The camera analysis module 129 can determine if the one or more objects are visible, partially visible, or not visible within a FOV of a given camera feed.

In some implementations, a property includes different regions indicating required security. For example, a walkway to a house can require high security as it is a high traffic area where a security system is likely to see incoming persons. A side lawn or sidewalk in front of a property can have a lower security requirement. For one threshold, the camera analysis module 129 can determine if high security areas are fully covered by the camera position and camera type generated by the control unit 101. In some implementations, a threshold for security area coverage is a sole threshold. For example, if security areas are covered, the camera analysis module 129 provides a corresponding camera placement, such as the camera placement 131, to a device, such as user device 133.

In some implementations, the camera analysis module 129 checks one or more thresholds. For example, the camera analysis module 129 can check the feed of the camera feed module 125 against a first threshold for coverage of actions of the action engine 119. For example, the action engine 119 can generate actions each of which, or a portion of which, should be fully captured by a given positioned camera in order for the camera to satisfy the threshold. The camera analysis module 129 can generate a score using the images and content depicted in the images, e.g., computer generated avatars. The camera analysis module 129 can compare the score to the threshold to determine whether the camera satisfies the threshold. In the example of FIG. 1, the action can include a person walking up to the house 109. The camera feed shown in 127 shows the avatar 121a fully visible. In some implementations, if an avatar performing an action is fully visible, the camera placement satisfies the first threshold and the control unit 101 can provide corresponding details of the placement to a device, such as the user device 133.

In some implementations, the camera analysis module 129 runs security alert tests. For example, the camera analysis module 129 can process the camera feed from the camera feed module 125 as if it were real world footage and generate corresponding alerts according to property details indicating alerts for a property, e.g., property information from the information 105. Based on the alert rule, the virtual model and the actions of the action engine 119, and whether or not an alert was generated by the camera analysis module 129, the camera analysis module 129 can determine if a camera position satisfies a security threshold. For example, an alert rule for a property can include alerting a user when a person walks on the walkway towards the real world version of house 109. Based on the virtual model and the actions of the action engine 119, the camera analysis module 129 can determine that the avatar 121a is indeed walking on the walkway toward the house 109. If the camera analysis module 129 generates the alert for the avatar 121a walking on the walkway, the given camera position can satisfy the threshold. If the camera analysis module 129 does not generate the alert, the position does not satisfy the threshold and the control unit 101 can perform another iteration of positioning and analysis.

In some implementations, the camera analysis module 129 performs analysis to determine a most likely optimal position. For example, the camera analysis module 129 can compare feed from multiple positions captured by the camera feed module 125 for multiple cameras, which can include multiple camera types and multiple positions of the cameras. The camera analysis module 129 can determine whether or not the positions and corresponding cameras satisfy one or more thresholds as discussed herein for capturing actions. In addition to or instead of determining one or more thresholds are satisfied, the camera analysis module 129 can determine the quality of the feed. In some cases, the camera analysis module 129 can compare the quality of the feed to a threshold. The camera analysis module 129 can determine a quality threshold and a quality of a stream from a given camera at a given position and compare the quality threshold to the quality of the stream to determine if the given camera and position satisfy the threshold. In some cases, the camera analysis module 129 can rank cameras and corresponding positions. If a virtual camera is capturing activity from a virtual street or side walk but only partially capturing activity from the walkway, the camera and corresponding position can be ranked below a position for a camera that fully captures the walkway activity. In some implementations, priority areas can include other regions besides a walkway, such as a patio, porch, garage, among others.

In some implementations, a factor affecting a camera position ranking includes lighting at different times of day or year. The control unit 101 can simulate lighting conditions in the model. For example, a particular camera position may fully capture a scene with good quality at 9 AM but sun glare at 3 PM, as simulated by the control unit 101, will reduce the quality of the scene capture. In another example, a camera at a certain position may work well at 10 AM but a target area captured by the camera may be too dark for accurate detections at 4 PM. Similarly, lighting in a first season (e.g., summer) may make some positions more preferential than others while lighting in a second season (e.g., winter) may make some positions less preferential. In some implementations, a user indicates a time prioritization for security. For example, a user can indicate that morning detections are more important than afternoon detections, or vice-versa. In this case, the camera analysis module 129 can weight morning quality of images and regions covered more than afternoon (e.g., bad quality or lacking coverage in the morning decreases a rank of a camera position more than bad quality or lacking coverage in the afternoon).

In some implementations, the camera analysis module 129 determines an elapse time between when an action of the action engine 119 starts and when the action is captured in camera feed. For example, actions within the virtual model can be timestamped. The avatar 121a can start walking down the walkway at Time T1. When the camera analysis module 129 detects the avatar 121a, the camera analysis module 129 can determine an elapse time between the action and detection. In some implementations, the camera analysis module 129 accessing data with the feed from the camera feed module 125 that specifies the time that actions actually occurred. The camera analysis module 129 can use the information to determine an elapse time between the action occurring and the action being detected in the feed.

In some implementations, the camera analysis module 129 filters camera positions based on an elapsed time. For example, the camera analysis module 129 can determine that the camera at position 115a detects the avatar 121a 10 seconds after the avatar 121a starts walking down the walkway towards the house 109. In this example, the 10 second delay in detection of the avatar can indicate that the camera at position 115a is in a suboptimal position, at a suboptimal angle, something is blocking the camera's view of the entire walkway, or a combination of these, since the camera should have detected the avatar more quickly, e.g., with a shorter delay. The camera analysis module 129 can compare this time to a threshold. The threshold can be a fixed or a dynamic threshold. For instance, the threshold can indicate a fixed amount of elapsed time that a determined amount of elapsed time should satisfy. When the threshold is dynamic, the threshold can be based on the elapsed time, other elapsed times from other camera positions, or both, e.g., the threshold can indicate selection of the smallest elapsed time. The camera analysis module 129 can use the comparison of the elapsed time with the threshold to determine whether to select the position 115a as the camera placement 131.

In some implementations, the camera analysis module 129 accesses property details in the information 105 to determine user preferences for the property, including an indication of when activity should be detected. If a given elapse time does not satisfy a threshold determined from the information 105, the camera analysis module 129 can choose a different position that satisfies the threshold, provide a feedback to the camera placement engine 113 indicating a direction to move the placement, including an angle or type of camera change, that would more likely satisfy the threshold, or a combination of both. For example, if the FOV does not fully cover the walkway, the camera analysis module 129 can send a feedback signal to the camera placement engine 113 to place a different camera type with a larger FOV at the same location.

In some implementations, the camera analysis module 129 provides feedback to the camera feed module 125. For example, the camera analysis module 129 can provide feedback that a wider FOV is likely required to capture actions. The camera feed module 125 can generate a feed for the same position and the same actions but with a different camera type according to the feedback data from the camera analysis module 129. Parameters of a camera at a position can include, angle of the camera, type of camera, lens of camera, operation mode of the camera, among others. In some implementations, the control unit 101 generates feeds for multiple parameter settings of a particular camera position. For example, the camera analysis module 129 can determine, based on multiple generated virtual feeds, which feed satisfies one or more thresholds or, as determined by a ranking, are included in the camera placement 131 which may include one or more camera placements.

In some implementations, the control unit 101 can generate a plurality of camera positions and corresponding camera feeds. For example, tens or hundreds of camera feeds can be generated and stored for analysis. The camera analysis module 129 can rank or select one or more positions that satisfy a threshold as discussed herein, or more clearly show actions compared to other camera feeds, such as not occluded, not blurry, among other features.

In some implementations, a user, through a control interface or a user device communicably connected to the control unit 101, interacts with the control unit 101 to control actions within the virtual model. For example, a user can control an avatar and walk in a particular area. The user can provide data to the control unit 101 indicating that a camera placement must capture the activity of the avatar controlled by the user. For example, the user can control the avatar 121a. The user can provide data to the control unit 101 indicating that any placement must fully capture the avatar 121a as it walks down the walkway or generate a corresponding alert. If no alert is generated or the alert is generated too late, the user can manually adjust a camera placement (e.g., after the control unit 101 provides an indication that there is or is not an alert generated). The user can use obtained video feed of the actions of the avatar 121*a* to aid in the adjustment.

In some implementations, the action engine 119 generates virtual activity. For example, the action engine 119 can generate one or more avatars in the virtual model and generate actions to be performed by the avatars in the virtual model. The avatars can include people, animals, or a combination of both. The avatars can be choreographed to run through various scenarios. The results can be observed from a virtual camera. Optional virtual video analytics and virtual rule monitoring can be run in parallel or used after scenarios have been generated and saved in system storage. By analyzing video before real installation, the placement and type of camera installed can be fine-tuned in order to maximize the efficiency of a security system to cover the maximum amount of area with a limited number of cameras, thereby reducing electricity, processing requirements (e.g., processing requirements from the real world system as well as storage requirements of obtained image data), or both, while maximizing security of a given property.

In some implementations, the virtual model can include environmental features of the property that obscure view of cameras. For example, if a property includes plants on the front porch or pillars, these features can occlude objects or other activity from the action engine 119. In some implementations, the camera placement engine 113 can generate placements that minimize the area occluded by the environmental features, including structures, of a property. A particular virtual FOV may cover an entire front lawn if not for a planter hanging nearby blocking half the view. The control unit 101 can generate a notification for a user, and send the notification to a user device, indicating that the planter or other obstruction is obstructing a possible location for a camera. The user can interact with the user device and send data to the control unit 101 indicating that either the user can change the property to remove the obstruction or that the obstruction will remain. The control unit 101 can update the virtual model accordingly. In some implementations, the control unit 101 generates data for the planter not being there and provides corresponding data to a user. After reviewing the data, a user can determine whether or not they prefer to remove the obstruction, e.g., a planter, or leave as is.

In some implementations, the process, including actions performed by the avatars 121*a-c*, is run at a much faster speed than reality. For example, the control unit 101 can simulate and process virtual camera feed as fast as the processors of the control unit 101 will allow. This allows for running many simulations in a short period of time—much faster than an installer could physically do. The control unit 101 can run one or more virtual test scenarios for a given hypothetical install very quickly, all before providing an indication to a device of installer personnel to perform an actual camera installation.

In some implementations, the camera placement engine 113 determines a camera position based on the physical dimensions of a camera. For example, the camera placement engine 113, either automatically or with user input, can determine that an ideal mounting for a camera would be at the top of a post at the far end of a porch. But the camera placement engine 113 can obtain physical dimensions of available cameras that will not fit in that position due to an overhang physically blocking a camera of that size or shape from being placed in that specific position. Or the camera placement engine 113 may detect that while a particular model could be mounted in a particular spot, there are obstructions blocking it from swiveling to a particular angle. The camera placement engine 113 can adjust a corresponding camera position to account for swivel angle and physical dimension of a camera or determine what camera types would fit in a particular position.

In some implementations, the control unit 101 receives user input indicating a region to be covered. For example, a user can provide data to the control unit 101 indicating that the user wants a particular area covered. The control unit 101 can use constraints, e.g., placement thresholds, property information, camera information, among others and described herein, to generate viable mounting positions that would include the specified area. The camera analysis module 129 can determine whether or not the specified area is actually covered or the control unit 101 can provide feed data to a user device for the user to determine if the camera placement sufficiently covers the specified area.

In some implementations, the control unit 101 can use the virtual model, or another presentation interface, to present information that indicates regions of the property that are covered by particular sensors, regions of the property that are not covered by particular sensors, or a combination of both. For instance, after analyzing virtual sensor data for an avatar, the control unit 101 can determine that a first portion of a sidewalk, e.g., near the street, is not covered by a sensor, e.g., a camera or a motion sensor, and a second portion of a sidewalk, e.g., near the property, is covered by a sensor. In this example, the control unit 101 can overlay information on the two portions of the sidewalk in the virtual environment, with a first portion identifying the not covered portion of the sidewalk and a second portion identifying the covered portion of the sidewalk. The overlap of the two portions can be different to distinguish between whether the sensor covers the respective portion or not. For instance, the control unit 101 can use different colors for the different portions. In some examples, the control unit 101 can use different presentation, e.g., colors, to distinguish data coverage for different sensors, e.g., a camera or a motion sensor.

In some implementations, a user manually fine tunes a camera placement while simultaneously watching the impact on the virtual camera feed. For example, the control unit 101 can generate action or receive data from a user indicating action for an avatar of the virtual model. The control unit 101 can provide a camera feed from a virtual camera position within the virtual model to a user. The user can, simultaneously, adjust the virtual position of the camera to fine tune the position and see the effect in real time on the camera feed. The user can provide an indication to the control unit 101 that the current location should be saved. The control unit 101 can save and provide the placement, together with placement details, including camera type among other parameters, to a device of the user. The control unit 101 can also aid in real world installation as described in reference to FIG. 3.

In some implementations, a user manually selects a camera placement in the model. For example, the user can use any manner of interface to connect with the control unit 101. The control unit 101 can obtain input from the user to generate the camera placements in the model. The user can use the interface to select a particular type of camera or provide data to the control unit 101 to directly place the camera within the model at a particular location. This manual method can be used to determine good locations for cameras. Such manual placement can be especially useful in areas were training data is sparse or that are unique (e.g., obstruction elements or security needs).

Figure 2:
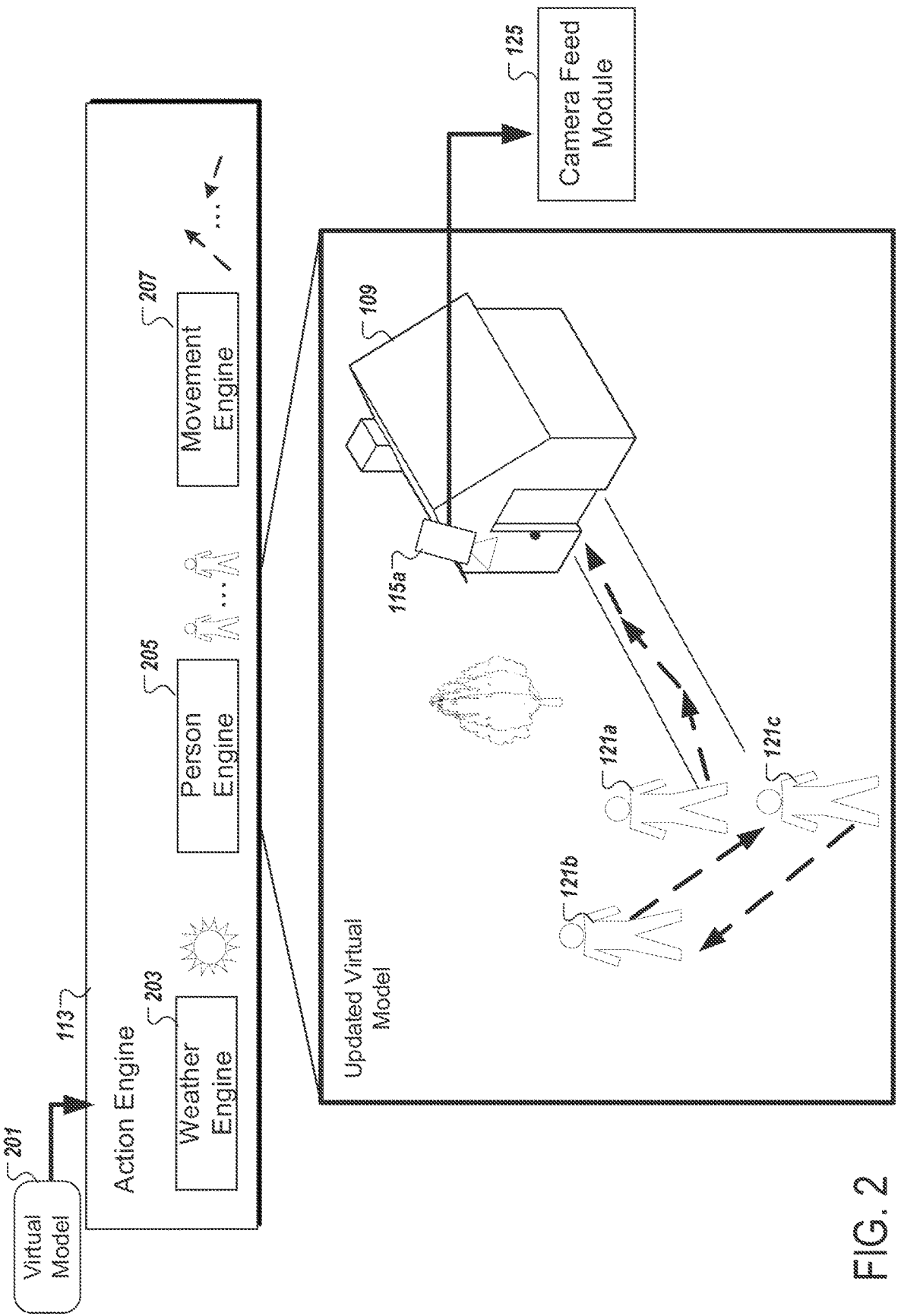
FIG. 2 is a diagram showing an example of an action engine generating action within a virtual model.

FIG. 2 is a diagram showing an example of the action engine 119 generating action within a virtual model 201. For ease of illustration, the virtual model 201 is the same virtual model shown in FIG. 1 and the action engine 119 is of the control unit 101. FIG. 2 shows how the virtual model 201, which can be generated or obtained by the model engine 107, is accessed by the action engine 119. The action engine 119 then generates actions within the virtual model. The action engine 119 can include one or more engines for generating specific actions or events within the virtual model 201. For example, as shown in FIG. 2, the action engine 119 can include a weather engine 203, a person engine 205, and a movement engine 207.

The weather engine 203 generates effects in the virtual model 201 of a given weather type. For example, the weather engine 203 can generate glare on objects when the weather is sunny, computer generated rain for rainy weather, snow accumulation for snowfall, among other effects. As discussed herein, the control unit 101 can generate many different possible placements and actions including the same actions or activity in different weather conditions to ensure that the camera placement does not fail because of certain types of weather. As discussed herein, the weather effect can be captured in the virtual camera feed and processed by the camera analysis module 129.

The person engine 205 generates avatars, such as the avatars 121a-c. Avatars can include people as well as animals or objects, such as cars bikes, or the like. The avatars 121a-c can look life-like and include facial features for distinguishing key personnel. For example, one of the avatars 121a-c can be generated with the face of the owner of the house 109. The identity of a user can affect alerts of the system 100. The person engine 205 can obtain stock avatars from computer storage or generate specific avatars from footage obtained at a property or provided by a user.

In some implementations, the person engine 205 obtains additional data obtained at a property. For example, control unit 101 can use gait recognition to identify people. The control unit 101 can extract gait, or other patterns, from existing footage obtained at a property. The control unit 101, or the person engine 205, can then simulate patterns of real world behavior, such as a gait of a person.

The movement engine 207 can generate movement for avatars. For example, the movement engine 207 can determine, based on stored data for a property, typical motion of people. Video footage can show people walking down the walkway to the house 109. The movement engine 207 can generate one or more movement vectors from the obtained footage or obtain the vectors from information 105 of a given property. The action engine 119 can then move the avatars according to the movement vectors. The movement can include generating life-like movement of limbs of a person or animal as well as features of a moving object, such as rolling wheels of a car among others, as the avatar moves from one location to another corresponding to the one or more generated movement vectors.

Figure 3:
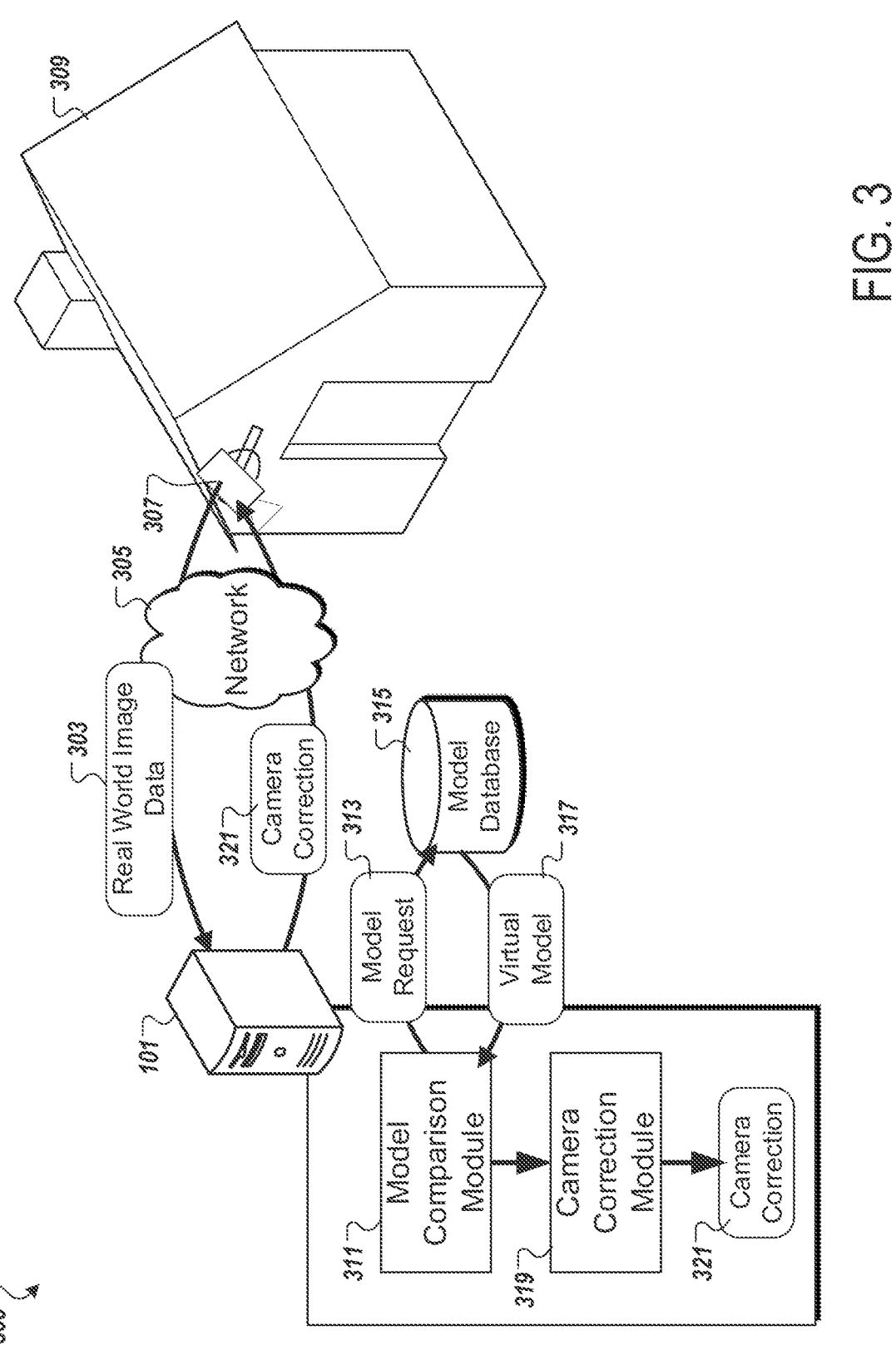
FIG. 3 is a diagram showing an example of a system for assisting real world camera installation.

FIG. 3 is a diagram showing an example of a system 300 for assisting real world camera installation. An installer may install a camera based on data provided by the system 100 of FIG. 1. However, the installation may require adjustment or the installer may require real time adjustment as the installation is being performed. The system 300 uses real world camera data matched with virtual model data to determine when the real world placement of camera 307 matches a virtual placement of a virtual camera in virtual model 317.

The system 300 includes the control unit 101. The control unit 101 is communicably connected to obtain video footage from a camera 307 at a property 309. The property 309 can be the real world version of the virtual representation 109. The control unit 101 obtains the real world image data 303 from the camera 307 over the network 305. The network 305 can include one or more wired or wireless connections.

A model comparison module 311 of the control unit 101 sends a model request 313 corresponding the property 309 to model database 315. The model database 315 can store one or more models generated by one or more computers. The model request 313 can include an identifier for the property 309. In some implementations, the control unit 101 parses the image data 303 to detect one or more features of the property 309 to uniquely identify the property 309. The identifier of the property 309 can include one or more characters, including alphanumerical characters. The control unit 101 can access the virtual model 317 based on querying the model database 315 with the model request 313.

The model comparison module 311 compares the virtual model, and associated camera placements stored in the virtual model 317, with the real world image data 303. For example, the virtual model 317 can be saved in the model database 315 with an indication of one or more camera placements. The control unit 101 can obtain information from the camera 307 or can parse the image data 303 to determine which placement, of a number of stored camera placements of the virtual model 317, corresponds to the placement of the camera 307. The control unit 101 can determine which camera placement stored with the virtual model 317 corresponds to the placement of the real world camera 307.

The model comparison module 311 can determine differences in the appearance of features within the image data 303 and features within a view of a virtual camera in the virtual model 317 at the same or similar position to the position of the camera 307. For example, the control unit 101 can detect a walkway in the image data 303 at a first position relative to a FOV of the camera 307 and a virtual representation of the walkway in a virtual camera feed at a second position relative to a FOV of a virtual camera placement.

Based on the relative distance between features, the camera correction module 319 determines adjustments to a current position of the camera 307. For example, the camera correction module 319 can generate a camera correction 321 indicating a movement for the camera 307 to match with the virtual camera placement of the virtual model 317. To take a specific example, the model comparison module 311 can determine that a position of a first feature present in both the image data 303 and the virtual model is not in the same location relative to a FOV of the actual camera 307 and a virtual camera placement in the virtual model 317. The first feature may be 10 pixels to the left in the image data 303 compared to the virtual camera feed. The camera correction module 319 can generate a camera correction 321 indicating the camera 307 to be moved to the right to correct for the error in placement. In some implementations, other units, other than pixels, such as inches, are used.

In some implementations, once cameras have been placed in a virtual model, the control unit 101 can output plans or instructions to guide installers in duplicating this installation in the real world. In some implementations, the control unit 101 uses three-dimensional information of a virtual model to provide guidance using an augmented reality interface. For example, the augmented reality interface can show an installer exactly where on the wall or ceiling to mount a given camera. The augmented reality interface can include indications, such as the camera correction 321 generated by the control unit 101 to correct a given camera placement in real time before screws or other fittings are secured.

In some circumstances, a stud might not be where the information 105 indicated it ought to be or was predicted to be, or some other factor not represented in the virtual model might interfere with mounting a camera in a given location. Based on images of the camera mount taken from a user device of an installer, such as an augmented reality interface, the control unit 101 can update the position of the camera in the virtual model to match the actual installed location. After updating the actual position, the control unit 101 can optimize camera parameters, similar to FIG. 1, to find, without adjusting the position, an optimal angle or other parameters of the camera given the constraint in camera positioning. A virtual model, such as the virtual model 317 or 201 can be updated based on data observed by an installer of a property to reflect actual conditions of a property so that the virtual model is as close as real-world accuracy as possible to improve the reliability of subsequent camera positioning.

Once cameras are mounted, the system 300 can guide the installer to adjust the angle of the camera to more precisely match the view that had been selected in the virtual model 317. The camera correction module 319 can determine matching local features in the actual imagery from the camera to the virtual model 317 camera feed. The camera correction 321 can be provided to a user as an audio or visual cue indicating which way to move the camera 307. If the camera 307 is a pan, tilt, and zoom (PTZ) camera, the control unit 101 can directly send a signal to the camera 307 configured to control the camera 307 to pan, tilt, or zoom. The control unit 101 can monitor the image data 303 and send control signals to the camera 307 to match the positioning of the camera 307 to the positioning determine in the virtual model 317.

In some implementations, the camera 307 includes one or more mechanized actuators controllable by the control unit 101. The mechanized actuators can be a part of the camera 307 or part of a mounting system for the camera 307. For example, the camera 307 can have one or more PTZ actuators as well as vertical or horizontal, or a combination of horizontal and vertical actuators, configured to move the camera 307 or change a pointing direction of the camera 307. The control unit 101 can configure the camera correction 321 such that, when the camera 307 receives the camera correction 321, one or more of the actuators that control the camera 307 are activated. In some implementations, the control unit 101 performs multiple iterations of sending correction controls and then analyzing the FOV of the camera 307 to determine when the FOV for the camera 307 matches the FOV from the virtual model 317.

In some cases, after the camera 307 is in position and angled correctly, the control unit 101 can compare the real scene shown in the image data 303 with the virtual model and find discrepancies such as a new piece of furniture or a window that was incorrectly sized in the model. The imagery from the camera can be used to identify these differences and directly update the virtual model 317. The imagery can also be used to flag these areas to be re-scanned or re-modeled.

In some implementations, systems described herein can be used for training installers. In addition to modeling real houses, systems can use training models, or even generate random house models to train and test installers. The installer might be given a set of cameras to install and told to cover a certain scenario or a certain area. They can then place the cameras in a virtual model using an interface for a control unit, such as the control unit 101. The virtual model can provide simulations of a full install including running wires, making connections, installing mounting plates, among others. The installer can then see the virtual results including simulated results of any video analytics rules. Results can include virtual images of simulated people, animals, and vehicles entering the scene. Installers trained in this way could then bring this expertise to real properties where detailed three-dimensional models might not exist.

FIG. 4 is a flow diagram illustrating an example of a process 400 for generating a placement of a camera. The process 400 can be performed by a computer, such as the control unit 110.

The process 400 includes obtaining monitoring information of the property (402). For example, the control unit 101 can obtain the property and monitor information 105 from the monitor database 103. The property and monitor information 105 can include data for modeling an environment, a previously generated model of an environment, real world security data (e.g., camera footage, proximity sensor data, among others) obtained from one or more properties, among others.

The process 400 includes generating a virtual model of a property (404). For example, the control unit 101 can generate a virtual model of a property based on the property and monitor information 105. In some implementations, the property and monitor information 105 includes an identifier of a previously generated model. For example, the control unit 101 can parse the property and monitor information 105 to obtain an identifier of a model. The control unit 101 can obtain a previously generated model based on the identifier of the model. In some implementations, the control unit 101 obtains a previously obtained model from the monitor database 103 or another database or storage device communicably connected to the control unit 101.

The process 400 includes determining an initial placement location for a camera in the virtual model (406). For example, the camera placement engine 113 can place a camera at camera position 115a. The camera position 115a can be an initial position that is analyzed before, or in parallel, with other camera positions, such as camera positions 115b-c.

The process 400 includes obtaining image data generated in the virtual model from the camera placed at the initial placement location (408). For example, the camera feed module 125 can generate simulated data from the camera at a camera position, e.g., camera position 115a. The camera feed module 125 can generate image data that includes features simulated within the virtual model shown in images 111, 117, and 123. For example, the camera feed module 125 can generate image data including the avatar 121a. The camera feed module 125 can simulate a field of view that corresponds to an actual field of view for a real world camera which the camera at the position 115a is simulating. In some implementations, the real world camera information, such as field of view, focal length, zoom capabilities, among others, are obtained from the monitor database 103. In some implementations, the camera placement engine 113 places cameras that are available for installation at, actually at, or both, the physical property for which the virtual model of the property was generated.

The process 400 includes analyzing the image data (410). For example, the camera analysis module 129 can analyze the camera feed simulated from the virtual model based on actions simulated by the action engine 119. The camera analysis module 129 can determine, based on the captured data, such as image data, whether the position or the type of camera satisfies one or more thresholds. Based on the position of the type of camera satisfying one or more thresholds, the camera analysis module 129 can determine if the position and camera are to be output as the camera placement 131 or if further iterations of camera placement and analysis are required.

The process 400 includes determining whether to identify an updated placement location using the analysis of the image data (412). For example, if one or more thresholds are not satisfied or satisfied, depending on implementation, the camera analysis module 129 can determine whether to update a position or camera type and re-analyze. To update a position, the camera analysis module 129 can send a signal to the camera placement engine 113. The signal can be configured to cause the camera placement engine 113 to generate one or more additional camera placements. Each of the one or more camera placements can have a corresponding camera type or the camera feed module 125 can generate multiple feeds for each position corresponding to different types of camera. The camera analysis module 129 can then analyze this new data to determine if one or more thresholds have been satisfied to output one or more camera positions or types in the camera placement 131.

The process 400 includes providing the placement location to a device of a user (414). For example, the camera analysis module 129 can provide one or more camera positions and corresponding camera types in the camera placement 131 to the user device 133. The camera placement 131 can include one or more signals configured to cause the user device 133 to display an indication of the one or more camera positions and corresponding camera types.

Figure 5:
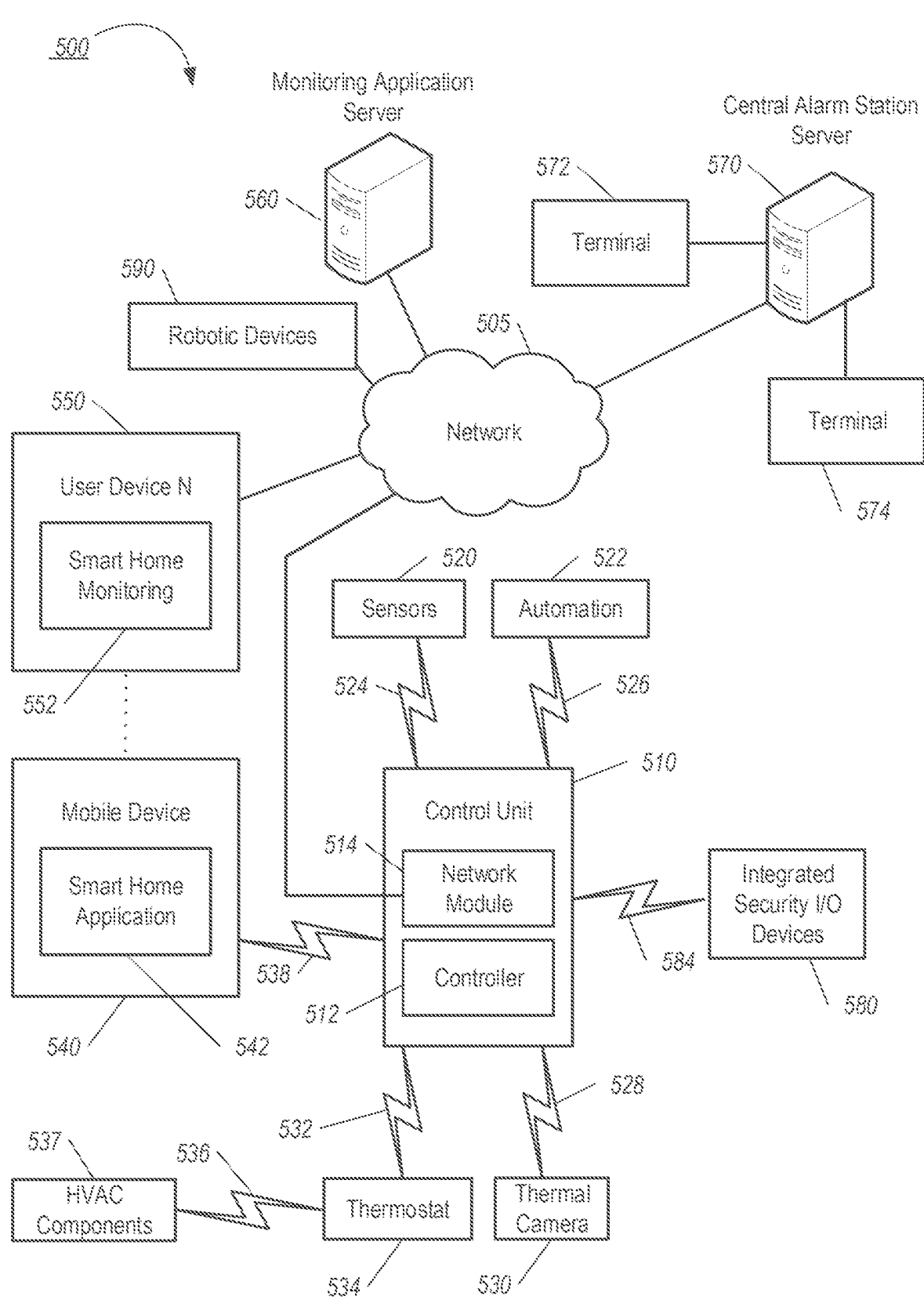
FIG. 5 is a diagram illustrating an example of a property monitoring system.

FIG. 5 is a diagram illustrating an example of a property monitoring system 500. In some cases, the property monitoring system 500 may include components of the system 100 of FIG. 1. For example, the robot 102 may be one of the robotic devices 590.

The network 505 is configured to enable exchange of electronic communications between devices connected to the network 505. For example, the network 505 may be configured to enable exchange of electronic communications between the control unit 510, the one or more user devices 540 and 550, the monitoring server 560, and the central alarm station server 570. The network 505 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. The network 505 may include multiple networks or subnetworks, each of which may include, for example, a wired or wireless data pathway. The network 505 may include a circuit-switched network, a packet-switched data network, or any other network able to carry electronic communications (e.g., data or voice communications). For example, the network 505 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 505 may include one or more networks that include wireless data channels and wireless voice channels. The network 505 may be a wireless network, a broadband network, or a combination of networks including a wireless network and a broadband network.

The control unit 510 includes a controller 512 and a network module 514. The controller 512 is configured to control a control unit monitoring system (e.g., a control unit system) that includes the control unit 510. In some examples, the controller 512 may include a processor or other control circuitry configured to execute instructions of a program that controls operation of a control unit system. In these examples, the controller 512 may be configured to receive input from sensors, flow meters, or other devices included in the control unit system and control operations of devices included in the household (e.g., speakers, lights, doors, etc.). For example, the controller 512 may be configured to control operation of the network module 514 included in the control unit 510.

The network module 514 is a communication device configured to exchange communications over the network 505. The network module 514 may be a wireless communication module configured to exchange wireless communications over the network 505. For example, the network module 514 may be a wireless communication device configured to exchange communications over a wireless data channel and a wireless voice channel. In this example, the network module 514 may transmit alarm data over a wireless data channel and establish a two-way voice communication session over a wireless voice channel. The wireless communication device may include one or more of a LTE module, a GSM module, a radio modem, cellular transmission module, or any type of module configured to exchange communications in one of the following formats: LTE, GSM or GPRS, CDMA, EDGE or EGPRS, EV-DO or EVDO, UMTS, or IP.

The network module 514 also may be a wired communication module configured to exchange communications over the network 505 using a wired connection. For instance, the network module 514 may be a modem, a network interface card, or another type of network interface device. The network module 514 may be an Ethernet network card configured to enable the control unit 510 to communicate over a local area network and/or the Internet. The network module 514 also may be a voice band modem configured to enable the alarm panel to communicate over the telephone lines of Plain Old Telephone Systems (POTS).

The control unit system that includes the control unit 510 includes one or more sensors 520. For example, the monitoring system may include multiple sensors 520. The sensors 520 may include a lock sensor, a contact sensor, a motion sensor, or any other type of sensor included in a control unit system. The sensors 520 also may include an environmental sensor, such as a temperature sensor, a water sensor, a rain sensor, a wind sensor, a light sensor, a smoke detector, a carbon monoxide detector, an air quality sensor, etc. The sensors 520 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the health monitoring sensor can be a wearable sensor that attaches to a user in the home. The health monitoring sensor can collect various health data, including pulse, heart rate, respiration rate, sugar or glucose level, bodily temperature, or motion data.

The sensors 520 can also include a radio-frequency identification (RFID) sensor that identifies a particular article that includes a pre-assigned RFID tag.

The system 500 also includes one or more thermal cameras 530 that communicate with the control unit 510. The thermal camera 530 may be an IR camera or other type of thermal sensing device configured to capture thermal images of a scene. For instance, the thermal camera 530 may be configured to capture thermal images of an area within a building or home monitored by the control unit 510. The thermal camera 530 may be configured to capture single, static thermal images of the area and also video thermal images of the area in which multiple thermal images of the area are captured at a relatively high frequency (e.g., thirty images per second). The thermal camera 530 may be controlled based on commands received from the control unit 510. In some implementations, the thermal camera 530 can be an IR camera that captures thermal images by sensing radiated power in one or more IR spectral bands, including NIR, SWIR, MWIR, and/or LWIR spectral bands.

The thermal camera 530 may be triggered by several different types of techniques. For instance, a Passive Infra-Red (PIR) motion sensor may be built into the thermal camera 530 and used to trigger the thermal camera 530 to capture one or more thermal images when motion is detected. The thermal camera 530 also may include a microwave motion sensor built into the camera and used to trigger the thermal camera 530 to capture one or more thermal images when motion is detected. The thermal camera 530 may have a "normally open" or "normally closed" digital input that can trigger capture of one or more thermal images when external sensors (e.g., the sensors 520, PIR, door/window, etc.) detect motion or other events. In some implementations, the thermal camera 530 receives a command to capture an image when external devices detect motion or another potential alarm event. The thermal camera 530 may receive the command from the controller 512 or directly from one of the sensors 520.

In some examples, the thermal camera 530 triggers integrated or external illuminators (e.g., Infra-Red or other lights controlled by the property automation controls 522, etc.) to improve image quality. An integrated or separate light sensor may be used to determine if illumination is desired and may result in increased image quality.

The thermal camera 530 may be programmed with any combination of time/day schedules, monitoring system status (e.g., "armed stay," "armed away," "unarmed"), or other variables to determine whether images should be captured or not when triggers occur. The thermal camera 530 may enter a low-power mode when not capturing images. In this case, the thermal camera 530 may wake periodically to check for inbound messages from the controller 512. The thermal camera 530 may be powered by internal, replaceable batteries if located remotely from the control unit 510. The thermal camera 530 may employ a small solar cell to recharge the battery when light is available. Alternatively, the thermal camera 530 may be powered by the controller's 512 power supply if the thermal camera 530 is co-located with the controller 512.

In some implementations, the thermal camera 530 communicates directly with the monitoring server 560 over the Internet. In these implementations, thermal image data captured by the thermal camera 530 does not pass through the control unit 510 and the thermal camera 530 receives commands related to operation from the monitoring server 560.

In some implementations, the system 500 includes one or more visible light cameras, which can operate similarly to the thermal camera 530, but detect light energy in the visible wavelength spectral bands. The one or more visible light cameras can perform various operations and functions within the property monitoring system 500. For example, the visible light cameras can capture images of one or more areas of the property, which the cameras, the control unit, and/or another computer system of the monitoring system 500 can process and analyze.

The system 500 also includes one or more property automation controls 522 that communicate with the control unit to perform monitoring. The property automation controls 522 are connected to one or more devices connected to the system 500 and enable automation of actions at the property. For instance, the property automation controls 522 may be connected to one or more lighting systems and may be configured to control operation of the one or more lighting systems. Also, the property automation controls 522 may be connected to one or more electronic locks at the property and may be configured to control operation of the one or more electronic locks (e.g., control Z-Wave locks using wireless communications in the Z-Wave protocol). Further, the property automation controls 522 may be connected to one or more appliances at the property and may be configured to control operation of the one or more appliances. The property automation controls 522 may include multiple modules that are each specific to the type of device being controlled in an automated manner. The property automation controls 522 may control the one or more devices based on commands received from the control unit 510. For instance, the property automation controls 522 may interrupt power delivery to a particular outlet of the property or induce movement of a smart window shade of the property.

The system 500 also includes thermostat 534 to perform dynamic environmental control at the property. The thermostat 534 is configured to monitor temperature and/or energy consumption of an HVAC system associated with the thermostat 534, and is further configured to provide control of environmental (e.g., temperature) settings. In some implementations, the thermostat 534 can additionally or alternatively receive data relating to activity at the property and/or environmental data at the home, e.g., at various locations indoors and outdoors at the property. The thermostat 534 can directly measure energy consumption of the HVAC system associated with the thermostat, or can estimate energy consumption of the HVAC system associated with the thermostat 534, for example, based on detected usage of one or more components of the HVAC system associated with the thermostat 534. The thermostat 534 can communicate temperature and/or energy monitoring information to or from the control unit 510 and can control the environmental (e.g., temperature) settings based on commands received from the control unit 510.

In some implementations, the thermostat 534 is a dynamically programmable thermostat and can be integrated with the control unit 510. For example, the dynamically programmable thermostat 534 can include the control unit 510, e.g., as an internal component to the dynamically programmable thermostat 534. In addition, the control unit 510 can be a gateway device that communicates with the dynamically programmable thermostat 534. In some implementations, the thermostat 534 is controlled via one or more property automation controls 522.

In some implementations, a module 537 is connected to one or more components of an HVAC system associated with the property, and is configured to control operation of the one or more components of the HVAC system. In some implementations, the module 537 is also configured to monitor energy consumption of the HVAC system components, for example, by directly measuring the energy consumption of the HVAC system components or by estimating the energy usage of the one or more HVAC system components based on detecting usage of components of the HVAC system. The module 537 can communicate energy monitoring information and the state of the HVAC system components to the thermostat 534 and can control the one or more components of the HVAC system based on commands received from the thermostat 534.

In some examples, the system 500 further includes one or more robotic devices 590. The robotic devices 590 may be any type of robot that are capable of moving and taking actions that assist in home monitoring. For example, the robotic devices 590 may include drones that are capable of moving throughout a property based on automated control technology and/or user input control provided by a user. In this example, the drones may be able to fly, roll, walk, or otherwise move about the property. The drones may include helicopter type devices (e.g., quad copters), rolling helicopter type devices (e.g., roller copter devices that can fly and/or roll along the ground, walls, or ceiling) and land vehicle type devices (e.g., automated cars that drive around a property). In some cases, the robotic devices 590 may be robotic devices 590 that are intended for other purposes and merely associated with the system 500 for use in appropriate circumstances. For instance, a robotic vacuum cleaner device may be associated with the monitoring system 500 as one of the robotic devices 590 and may be controlled to take action responsive to monitoring system events.

In some examples, the robotic devices 590 automatically navigate within a property. In these examples, the robotic devices 590 include sensors and control processors that guide movement of the robotic devices 590 within the property. For instance, the robotic devices 590 may navigate within the property using one or more cameras, one or more proximity sensors, one or more gyroscopes, one or more accelerometers, one or more magnetometers, a global positioning system (GPS) unit, an altimeter, one or more sonar or laser sensors, and/or any other types of sensors that aid in navigation about a space. The robotic devices 590 may include control processors that process output from the various sensors and control the robotic devices 590 to move along a path that reaches the desired destination and avoids obstacles. In this regard, the control processors detect walls or other obstacles in the property and guide movement of the robotic devices 590 in a manner that avoids the walls and other obstacles.

In addition, the robotic devices 590 may store data that describes attributes of the property. For instance, the robotic devices 590 may store a floorplan of a building on the property and/or a three-dimensional model of the property that enables the robotic devices 590 to navigate the property. During initial configuration, the robotic devices 590 may receive the data describing attributes of the property, determine a frame of reference to the data (e.g., a property or reference location in the property), and navigate the property based on the frame of reference and the data describing attributes of the property. Further, initial configuration of the robotic devices 590 also may include learning of one or more navigation patterns in which a user provides input to control the robotic devices 590 to perform a specific navigation action (e.g., fly to an upstairs bedroom and spin around while capturing video and then return to a home charging base). In this regard, the robotic devices 590 may learn and store the navigation patterns such that the robotic devices 590 may automatically repeat the specific navigation actions upon a later request.

In some examples, the robotic devices 590 may include data capture and recording devices. In these examples, the robotic devices 590 may include one or more cameras, one or more motion sensors, one or more microphones, one or more biometric data collection tools, one or more temperature sensors, one or more humidity sensors, one or more air flow sensors, and/or any other types of sensors that may be useful in capturing monitoring data related to the property and users at the property. The one or more biometric data collection tools may be configured to collect biometric samples of a person in the property with or without contact of the person. For instance, the biometric data collection tools may include a fingerprint scanner, a hair sample collection tool, a skin cell collection tool, and/or any other tool that allows the robotic devices 590 to take and store a biometric sample that can be used to identify the person (e.g., a biometric sample with DNA that can be used for DNA testing).

In some implementations, one or more of the thermal cameras 530 may be mounted on one or more of the robotic devices 590.

In some implementations, the robotic devices 590 may include output devices. In these implementations, the robotic devices 590 may include one or more displays, one or more speakers, and/or any type of output devices that allow the robotic devices 590 to communicate information to a nearby user.

The robotic devices 590 also may include a communication module that enables the robotic devices 590 to communicate with the control unit 510, each other, and/or other devices. The communication module may be a wireless communication module that allows the robotic devices 590 to communicate wirelessly. For instance, the communication module may be a Wi-Fi module that enables the robotic devices 590 to communicate over a local wireless network at the property. The communication module further may be a 900 MHz wireless communication module that enables the robotic devices 590 to communicate directly with the control unit 510. Other types of short-range wireless communication protocols, such as Bluetooth, Bluetooth LE, Z-wave, Zigbee, etc., may be used to allow the robotic devices 590 to communicate with other devices in the property. In some implementations, the robotic devices 590 may communicate with each other or with other devices of the system 500 through the network 505.

The robotic devices 590 further may include processor and storage capabilities. The robotic devices 590 may include any suitable processing devices that enable the robotic devices 590 to operate applications and perform the actions described throughout this disclosure. In addition, the robotic devices 590 may include solid state electronic storage that enables the robotic devices 590 to store applications, configuration data, collected sensor data, and/or any other type of information available to the robotic devices 590.

The robotic devices 590 can be associated with one or more charging stations. The charging stations may be located at a predefined home base or reference locations at the property. The robotic devices 590 may be configured to navigate to the charging stations after completion of tasks needed to be performed for the monitoring system 500. For instance, after completion of a monitoring operation or upon instruction by the control unit 510, the robotic devices 590 may be configured to automatically fly to and land on one of the charging stations. In this regard, the robotic devices 590 may automatically maintain a fully charged battery in a state in which the robotic devices 590 are ready for use by the monitoring system 500.

The charging stations may be contact-based charging stations and/or wireless charging stations. For contact-based charging stations, the robotic devices 590 may have readily accessible points of contact that the robotic devices 590 are capable of positioning and mating with a corresponding contact on the charging station. For instance, a helicopter type robotic device 590 may have an electronic contact on a portion of its landing gear that rests on and mates with an electronic pad of a charging station when the helicopter type robotic device 590 lands on the charging station. The electronic contact on the robotic device 590 may include a cover that opens to expose the electronic contact when the robotic device 590 is charging and closes to cover and insulate the electronic contact when the robotic device is in operation.

For wireless charging stations, the robotic devices 590 may charge through a wireless exchange of power. In these cases, the robotic devices 590 need only locate themselves closely enough to the wireless charging stations for the wireless exchange of power to occur. In this regard, the positioning needed to land at a predefined home base or reference location in the property may be less precise than with a contact based charging station. Based on the robotic devices 590 landing at a wireless charging station, the wireless charging station outputs a wireless signal that the robotic devices 590 receive and convert to a power signal that charges a battery maintained on the robotic devices 590.

In some implementations, each of the robotic devices 590 has a corresponding and assigned charging station such that the number of robotic devices 590 equals the number of charging stations. In these implementations, the robotic devices 590 always navigate to the specific charging station assigned to that robotic device. For instance, a first robotic device 590 may always use a first charging station and a second robotic device 590 may always use a second charging station.

In some examples, the robotic devices 590 may share charging stations. For instance, the robotic devices 590 may use one or more community charging stations that are capable of charging multiple robotic devices 590. The community charging station may be configured to charge multiple robotic devices 590 in parallel. The community charging station may be configured to charge multiple robotic devices 590 in serial such that the multiple robotic devices 590 take turns charging and, when fully charged, return to a predefined home base or reference location in the property that is not associated with a charger. The number of community charging stations may be less than the number of robotic devices 590.

Also, the charging stations may not be assigned to specific robotic devices 590 and may be capable of charging any of the robotic devices 590. In this regard, the robotic devices 590 may use any suitable, unoccupied charging station when not in use. For instance, when one of the robotic devices 590 has completed an operation or is in need of battery charge, the control unit 510 references a stored table of the occupancy status of each charging station and instructs the robotic device 590 to navigate to the nearest charging station that is unoccupied.

The system 500 further includes one or more integrated security devices 580. The one or more integrated security devices may include any type of device used to provide alerts based on received sensor data. For instance, the one or more control units 510 may provide one or more alerts to the one or more integrated security input/output devices 580.

Additionally, the one or more control units 510 may receive one or more sensor data from the sensors 520 and determine whether to provide an alert to the one or more integrated security input/output devices 580.

The sensors 520, the property automation controls 522, the thermal camera 530, the thermostat 534, and the integrated security devices 580 may communicate with the controller 512 over communication links 524, 526, 528, 532, and 584. The communication links 524, 526, 528, 532, and 584 may be a wired or wireless data pathway configured to transmit signals from the sensors 520, the property automation controls 522, the thermal camera 530, the thermostat 534, and the integrated security devices 580 to the controller 512. The sensors 520, the property automation controls 522, the thermal camera 530, the thermostat 534, and the integrated security devices 580 may continuously transmit sensed values to the controller 512, periodically transmit sensed values to the controller 512, or transmit sensed values to the controller 512 in response to a change in a sensed value.

The communication links 524, 526, 528, 532, and 584 may include a local network. The sensors 520, the property automation controls 522, the thermal camera 530, the thermostat 534, and the integrated security devices 580, and the controller 512 may exchange data and commands over the local network. The local network may include 802.11 "Wi-Fi" wireless Ethernet (e.g., using low-power Wi-Fi chipsets), Z-Wave, Zigbee, Bluetooth, "HomePlug" or other "Powerline" networks that operate over AC wiring, and a Category 5 (CAT5) or Category 6 (CAT6) wired Ethernet network. The local network may be a mesh network constructed based on the devices connected to the mesh network.

The monitoring server 560 is one or more electronic devices configured to provide monitoring services by exchanging electronic communications with the control unit 510, the one or more user devices 540 and 550, and the central alarm station server 570 over the network 505. For example, the monitoring server 560 may be configured to monitor events (e.g., alarm events) generated by the control unit 510. In this example, the monitoring server 560 may exchange electronic communications with the network module 514 included in the control unit 510 to receive information regarding events (e.g., alerts) detected by the control unit 510. The monitoring server 560 also may receive information regarding events (e.g., alerts) from the one or more user devices 540 and 550.

In some examples, the monitoring server 560 may route alert data received from the network module 514 or the one or more user devices 540 and 550 to the central alarm station server 570. For example, the monitoring server 560 may transmit the alert data to the central alarm station server 570 over the network 505.

The monitoring server 560 may store sensor data, thermal image data, and other monitoring system data received from the monitoring system and perform analysis of the sensor data, thermal image data, and other monitoring system data received from the monitoring system. Based on the analysis, the monitoring server 560 may communicate with and control aspects of the control unit 510 or the one or more user devices 540 and 550.

The monitoring server 560 may provide various monitoring services to the system 500. For example, the monitoring server 560 may analyze the sensor, thermal image, and other data to determine an activity pattern of a resident of the property monitored by the system 500. In some implementations, the monitoring server 560 may analyze the data for alarm conditions or may determine and perform actions at the property by issuing commands to one or more of the automation controls 522, possibly through the control unit 510.

The central alarm station server 570 is an electronic device configured to provide alarm monitoring service by exchanging communications with the control unit 510, the one or more mobile devices 540 and 550, and the monitoring server 560 over the network 505. For example, the central alarm station server 570 may be configured to monitor alerting events generated by the control unit 510. In this example, the central alarm station server 570 may exchange communications with the network module 514 included in the control unit 510 to receive information regarding alerting events detected by the control unit 510. The central alarm station server 570 also may receive information regarding alerting events from the one or more mobile devices 540 and 550 and/or the monitoring server 560.

The central alarm station server 570 is connected to multiple terminals 572 and 574. The terminals 572 and 574 may be used by operators to process alerting events. For example, the central alarm station server 570 may route alerting data to the terminals 572 and 574 to enable an operator to process the alerting data. The terminals 572 and 574 may include general-purpose computers (e.g., desktop personal computers, workstations, or laptop computers) that are configured to receive alerting data from a server in the central alarm station server 570 and render a display of information based on the alerting data. For instance, the controller 512 may control the network module 514 to transmit, to the central alarm station server 570, alerting data indicating that a sensor 520 detected motion from a motion sensor via the sensors 520. The central alarm station server 570 may receive the alerting data and route the alerting data to the terminal 572 for processing by an operator associated with the terminal 572. The terminal 572 may render a display to the operator that includes information associated with the alerting event (e.g., the lock sensor data, the motion sensor data, the contact sensor data, etc.) and the operator may handle the alerting event based on the displayed information.

In some implementations, the terminals 572 and 574 may be mobile devices or devices designed for a specific function. Although FIG. 5 illustrates two terminals for brevity, actual implementations may include more (and, perhaps, many more) terminals.

The one or more authorized user devices 540 and 550 are devices that host and display user interfaces. For instance, the user device 540 is a mobile device that hosts or runs one or more native applications (e.g., the smart home application 542). The user device 540 may be a cellular phone or a non-cellular locally networked device with a display. The user device 540 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 540 may perform functions unrelated to the monitoring system, such as placing personal telephone calls, playing music, playing video, displaying pictures, browsing the Internet, maintaining an electronic calendar, etc.

The user device 540 includes a smart home application 542. The smart home application 542 refers to a software/firmware program running on the corresponding mobile device that enables the user interface and features described throughout. The user device 540 may load or install the smart home application 542 based on data received over a network or data received from local media. The smart home application 542 runs on mobile devices platforms, such as iPhone, iPod touch, Blackberry, Google Android, Windows Mobile, etc. The smart home application 542 enables the user device 540 to receive and process image and sensor data from the monitoring system.

The user device 550 may be a general-purpose computer (e.g., a desktop personal computer, a workstation, or a laptop computer) that is configured to communicate with the monitoring server 560 and/or the control unit 510 over the network 505. The user device 550 may be configured to display a smart home user interface 552 that is generated by the user device 550 or generated by the monitoring server 560. For example, the user device 550 may be configured to display a user interface (e.g., a web page) provided by the monitoring server 560 that enables a user to perceive images captured by the thermal camera 530 and/or reports related to the monitoring system. Although FIG. 5 illustrates two user devices for brevity, actual implementations may include more (and, perhaps, many more) or fewer user devices.

The smart home application 542 and the smart home user interface 552 can allow a user to interface with the property monitoring system 500, for example, allowing the user to view monitoring system settings, adjust monitoring system parameters, customize monitoring system rules, and receive and view monitoring system messages.

In some implementations, the one or more user devices 540 and 550 communicate with and receive monitoring system data from the control unit 510 using the communication link 538. For instance, the one or more user devices 540 and 550 may communicate with the control unit 510 using various local wireless protocols such as Wi-Fi, Bluetooth, Z-wave, Zigbee, HomePlug (Ethernet over power line), or wired protocols such as Ethernet and USB, to connect the one or more user devices 540 and 550 to local security and automation equipment. The one or more user devices 540 and 550 may connect locally to the monitoring system and its sensors and other devices. The local connection may improve the speed of status and control communications because communicating through the network 505 with a remote server (e.g., the monitoring server 560) may be significantly slower.

Although the one or more user devices 540 and 550 are shown as communicating with the control unit 510, the one or more user devices 540 and 550 may communicate directly with the sensors 520 and other devices controlled by the control unit 510. In some implementations, the one or more user devices 540 and 550 replace the control unit 510 and perform the functions of the control unit 510 for local monitoring and long range/offsite communication.

In other implementations, the one or more user devices 540 and 550 receive monitoring system data captured by the control unit 510 through the network 505. The one or more user devices 540, 550 may receive the data from the control unit 510 through the network 505 or the monitoring server 560 may relay data received from the control unit 510 to the one or more user devices 540 and 550 through the network 505. In this regard, the monitoring server 560 may facilitate communication between the one or more user devices 540 and 550 and the monitoring system 500.

In some implementations, the one or more user devices 540 and 550 may be configured to switch whether the one or more user devices 540 and 550 communicate with the control unit 510 directly (e.g., through link 538) or through the monitoring server 560 (e.g., through network 505) based on a location of the one or more user devices 540 and 550. For instance, when the one or more user devices 540 and 550 are located close to the control unit 510 and in range to communicate directly with the control unit 510, the one or more user devices 540 and 550 use direct communication. When the one or more user devices 540 and 550 are located far from the control unit 510 and not in range to communicate directly with the control unit 510, the one or more user devices 540 and 550 use communication through the monitoring server 560.

Although the one or more user devices 540 and 550 are shown as being connected to the network 505, in some implementations, the one or more user devices 540 and 550 are not connected to the network 505. In these implementations, the one or more user devices 540 and 550 communicate directly with one or more of the monitoring system components and no network (e.g., Internet) connection or reliance on remote servers is needed.

In some implementations, the one or more user devices 540 and 550 are used in conjunction with only local sensors and/or local devices in a house. In these implementations, the system 500 includes the one or more user devices 540 and 550, the sensors 520, the property automation controls 522, the thermal camera 530, and the robotic devices 590. The one or more user devices 540 and 550 receive data directly from the sensors 520, the property automation controls 522, the thermal camera 530, and the robotic devices 590 (i.e., the monitoring system components) and sends data directly to the monitoring system components. The one or more user devices 540, 550 provide the appropriate interfaces/processing to provide visual surveillance and reporting.

In other implementations, the system 500 further includes network 505 and the sensors 520, the property automation controls 522, the thermal camera 530, the thermostat 534, and the robotic devices 590 are configured to communicate sensor and image data to the one or more user devices 540 and 550 over network 505 (e.g., the Internet, cellular network, etc.). In yet another implementation, the sensors 520, the property automation controls 522, the thermal camera 530, the thermostat 534, and the robotic devices 590 (or a component, such as a bridge/router) are intelligent enough to change the communication pathway from a direct local pathway when the one or more user devices 540 and 550 are in close physical proximity to the sensors 520, the property automation controls 522, the thermal camera 530, the thermostat 534, and the robotic devices 590 to a pathway over network 505 when the one or more user devices 540 and 550 are farther from the sensors 520, the property automation controls 522, the thermal camera 530, the thermostat 534, and the robotic devices 590. In some examples, the system leverages GPS information from the one or more user devices 540 and 550 to determine whether the one or more user devices 540 and 550 are close enough to the monitoring system components to use the direct local pathway or whether the one or more user devices 540 and 550 are far enough from the monitoring system components that the pathway over network 505 is required. In other examples, the system leverages status communications (e.g., pinging) between the one or more user devices 540 and 550 and the sensors 520, the property automation controls 522, the thermal camera 530, the thermostat 534, and the robotic devices 590 to determine whether communication using the direct local pathway is possible. If communication using the direct local pathway is possible, the one or more user devices 540 and 550 communicate with the sensors 520, the property automation controls 522, the thermal camera 530, the thermostat 534, and the robotic devices 590 using the direct local pathway. If communication using the direct local pathway is not possible, the one or more user devices 540 and 550 communicate with the monitoring system components using the pathway over network 505.

In some implementations, the system 500 provides end users with access to thermal images captured by the thermal camera 530 to aid in decision making. The system 500 may transmit the thermal images captured by the thermal camera 530 over a wireless WAN network to the user devices 540 and 550. Because transmission over a wireless WAN network may be relatively expensive, the system 500 can use several techniques to reduce costs while providing access to significant levels of useful visual information (e.g., compressing data, down-sampling data, sending data only over inexpensive LAN connections, or other techniques).

In some implementations, a state of the monitoring system and other events sensed by the monitoring system may be used to enable/disable video/image recording devices (e.g., the thermal camera 530 or other cameras of the system 500). In these implementations, the thermal camera 530 may be set to capture thermal images on a periodic basis when the alarm system is armed in an "armed away" state, but set not to capture images when the alarm system is armed in an "armed stay" or "unarmed" state. In addition, the thermal camera 530 may be triggered to begin capturing thermal images when the alarm system detects an event, such as an alarm event, a door-opening event for a door that leads to an area within a field of view of the thermal camera 530, or motion in the area within the field of view of the thermal camera 530. In other implementations, the thermal camera 530 may capture images continuously, but the captured images may be stored or transmitted over a network when needed.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random-access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially designed ASICs (application-specific integrated circuits).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure. A number of implementations have been described. Nevertheless, it will be understood that various modifications may be made without departing from the spirit and scope of the disclosure. For example, various forms of the flows shown above may be used, with steps re-ordered, added, or removed.

Embodiments of the invention and all of the functional operations described in this specification can be implemented in digital electronic circuitry, or in computer software, firmware, or hardware, including the structures disclosed in this specification and their structural equivalents, or in combinations of one or more of them. Embodiments of the invention can be implemented as one or more computer program products, e.g., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

What is claimed is:

1. A method comprising:
accessing a virtual model of a property;
determining an initial placement location for a virtual camera in the virtual model;
obtaining simulated image data of the property generated using the virtual model from the virtual camera placed at the initial placement location;
analyzing the simulated image data;
determining, using the analysis of the simulated image data, whether to identify an updated placement location using the initial placement location; and
providing, to a device, a placement location for a physical camera at the property using a result of the determination whether to identify the updated placement location, the placement location being the initial placement location or the updated placement location.

2. The method of claim 1, comprising:
receiving monitoring information of the property that indicates at least one mounting location, wherein determining the initial placement location for the virtual camera in the virtual model comprises:
determining, using the information of the at least one mounting location, the initial placement location for the virtual camera in the virtual model.

3. The method of claim 2, wherein the information of the at least one mounting location comprises information of at least one of a stud, an electricity source, an angle of a surface, a mounting point on a surface, a presence of a vent, or a presence of a sprinkler at the property.

4. The method of claim 2, comprising:
determining a distance between a location indicated by the information of the at least one mounting location and a candidate location satisfies a distance threshold; and
in response to determining the distance between the location indicated by the information of the at least one mounting location and the candidate location satisfies the distance threshold, determining the initial placement location for the virtual camera in the virtual model.

5. The method of claim 4, comprising:
in response to obtaining the monitoring information of the property, adjusting the distance threshold.

6. The method of claim 1, wherein accessing the virtual model of the property comprises:
generating, using monitoring information of the property, the virtual model of the property.

7. The method of claim 1, comprising:
receiving data that indicates at least one of (i) data of a previously generated model of an environment or (ii) real world security data from one or more properties, wherein determining the initial placement location for the virtual camera in the virtual model comprises:
determining, using the received data, the initial placement location for the virtual camera in the virtual model.

8. The method of claim 1, wherein:
accessing the virtual model of the property comprises (i) parsing monitoring information of the property to obtain an identifier of a previously generated model and (ii) obtaining the previously generated model from a database using the identifier in a query to the database.

9. The method of claim 1, wherein:
obtaining the simulated image data of the property generated using the virtual model from the virtual camera placed at the initial placement location comprises:
obtaining one or more images that depict at least a portion of a computer generated avatar moving in the virtual model of the property from a perspective of the virtual camera at the initial placement location, wherein analyzing the simulated image data comprises:
analyzing the one or more images that depict at least the portion of the computer generated avatar, wherein determining whether to identify the updated placement location comprises:
determining whether to identify the updated placement location using the analysis of the one or more images that depict at least the portion of the computer generated avatar.

10. The method of claim 9, comprising:
generating, using the analysis of the one or more images that depict at least the portion of the computer generated avatar, a rule for a monitoring system; and
providing, to the monitoring system, data for the rule to cause the monitoring system to apply the rule to at least one image captured by the virtual camera.

11. The method of claim 9, wherein analyzing the simulated image data comprises:
determining whether the one or more images that depict at least the portion of the computer generated avatar moving in the virtual model of the property represent a full view of the computer generated avatar.

12. The method of claim 11, comprising:
in response to determining that the one or more images of the computer generated avatar moving in the virtual model of the property do not represent a full view of the computer generated avatar, generating a coverage score representing an amount of the computer generated avatar; and
comparing the coverage score to a coverage threshold, wherein determining whether to identify the updated placement location comprises:
determining, using the comparison, whether to identify the updated placement location.

13. The method of claim 9, wherein the computer generated avatar comprises a human avatar.

14. The method of claim 1, wherein:

analyzing the simulated image data comprises determining an elapsed time between an action generated in the virtual model and a detection of the action represented in the simulated image data; and determining whether to identify the updated placement location uses the elapsed time.

15. The method of claim 14, comprising:

comparing the elapsed time to an elapse time threshold, wherein determining whether to identify the updated placement location comprises:

determining, using the comparison, whether to identify the updated placement location.

16. The method of claim 1, comprising:

generating, using the analysis of the simulated image data, a score indicating a coverage of actions included in the simulated image data, wherein determining whether to identify the updated placement location using the initial placement location using the analysis of the simulated image data, comprises:

comparing the generated score to a threshold to determine whether to identify the updated placement location using the initial placement location.

17. A system comprising one or more computers and one or more storage devices on which are stored instructions that are operable, when executed by the one or more computers, to cause the one or more computers to perform operations comprising:

accessing a virtual model of a property;

determining an initial placement location for a virtual camera in the virtual model;

obtaining simulated image data of the property generated using the virtual model from the virtual camera placed at the initial placement location;

analyzing the simulated image data;

determining, using the analysis of the simulated image data, whether to identify an updated placement location using the initial placement location; and providing, to a device, a placement location for a physical camera at the property using a result of the determination whether to identify the updated placement location, the placement location being the initial placement location or the updated placement location.

18. The system of claim 17, wherein the operations comprise:

receiving monitoring information of the property that indicates at least one mounting location, wherein determining the initial placement location for the virtual camera in the virtual model comprises:

determining, using the information of the at least one mounting location, the initial placement location for the virtual camera in the virtual model.

19. The system of claim 18, wherein the information of the at least one mounting location comprises information of a stud, an electricity source, an angle of a surface, a mounting point on a surface, a presence of a vent, or a presence of a sprinkler at the property.

20. One or more non-transitory computer storage media encoded with instructions that, when executed by one or more computers, cause the one or more computers to perform operations comprising:

accessing a virtual model of a property;

determining an initial placement location for a virtual camera in the virtual model;

obtaining simulated image data of the property generated using the virtual model from the virtual camera placed at the initial placement location;

analyzing the simulated image data;

determining, using the analysis of the simulated image data, whether to identify an updated placement location using the initial placement location; and providing, to a device, a placement location for a physical camera at the property using a result of the determination whether to identify the updated placement location, the placement location being the initial placement location or the updated placement location.

* * * * *